United States Patent [19]

Carlson

[11] 3,965,298

[45] June 22, 1976

[54] DEEP SEA DIVING SPEECH CONVERTER

[75] Inventor: James E. Carlson, Spring Valley, Calif.

[73] Assignee: Long Enterprises, San Diego, Calif.

[22] Filed: May 5, 1975

[21] Appl. No.: 574,432

[52] U.S. Cl. .............................................. 179/1 SH
[51] Int. Cl.[2] ............................................ G11B 5/02
[58] Field of Search .................... 179/1 SH, 15.55 T

[56] References Cited

UNITED STATES PATENTS

| | | | |
|---|---|---|---|
| 3,584,158 | 6/1971 | Jefferres | 179/1 SH |
| 3,632,877 | 1/1972 | Gray | 179/1 SH |

*Primary Examiner*—Kathleen H. Claffy
*Assistant Examiner*—E. S. Kemeny
*Attorney, Agent, or Firm*—Brown & Martin

[57] ABSTRACT

A device having an analog storage for storing in real time an electric analogue signal proportional to vocal tract resonance periods within speech pitch periods of speech in gas in deep sea diving. A clock is used for providing clock pulses proportional to the depth at which the speech is being made for clocking the analog signal into the analog storage device. A second clock is used for clocking the speech out of the analog storage device at that frequency corresponding to normal voice.

9 Claims, 5 Drawing Figures

DEEP SEA DIVING SPEECH CONVERTER

BACKGROUND OF THE INVENTION

Breathing gas mixtures of helium and oxygen are normally used in deep sea diving. As the speed of sound is much higher in helium than in air, the frequency of resonance of the diver's voice is increased while the periodicity or pitch of the voice is essentially unchanged. As the pressure increases with depth, the frequency of the resonance of the diver's voice is also increased such that at depths greater than about 300 feet, the effect of the helium-oxygen breathing gas and the pressure increases the resonance frequency of the voice to about twice normal. This results in nearly unintelligible speech. Greater depths further increase the resonance frequency of the voice such that at about 1500 feet, the resonant frequency is about 3.5 times normal and results in completely unintelligible speech from the diver.

Thus, it is advantageous to have a deep sea diving speech converter that converts the speech made in the helium-oxygen breathing gas at the diving depths to a normal resonant frequency of voice in air at the surface so that understandable communications can be made between the surface and the diver.

SUMMARY OF THE INVENTION

In an exemplary embodiment of this invention, a real time frequency of speech converter senses the vocal tract resonance periods of speech made by the diver in the helium-oxygen environment at depths in diving within the particular pitch periods of normal voice communication. A storage device stores into memory the received analog signals proportional to the resonant frequency of the speech during the vocal tract resonant periods. This stored electrical signal, that is reflective of the vocal communications, is then read from the memory at a rate slower than the storage rate to appropriately lower the frequency to that of normal voice resonant frequency.

The converter has means for setting the clocking rate of an analog storage device to that clock rate proportional to the increased frequency of speech in the helium-oxygen environment for the particular depth in which the speech is being made. This clock signal controls the rate of storage of the electrical signal of the speech being made. In a timed sequence and after the input signal has been stored, the storage device is read out at a pre-set clock rate corresponding to normal voice frequency. At least a pair of analog storage devices or shift registers are employed so that in normal voice communications, one voice signal is being read-out while the succeeding voice signal is being stored.

Other objects and many advantages of this invention will become more apparent upon a reading of the following detailed description and an examination of the drawings, wherein like reference numerals designate like parts throughout and in which.

Figure 2:
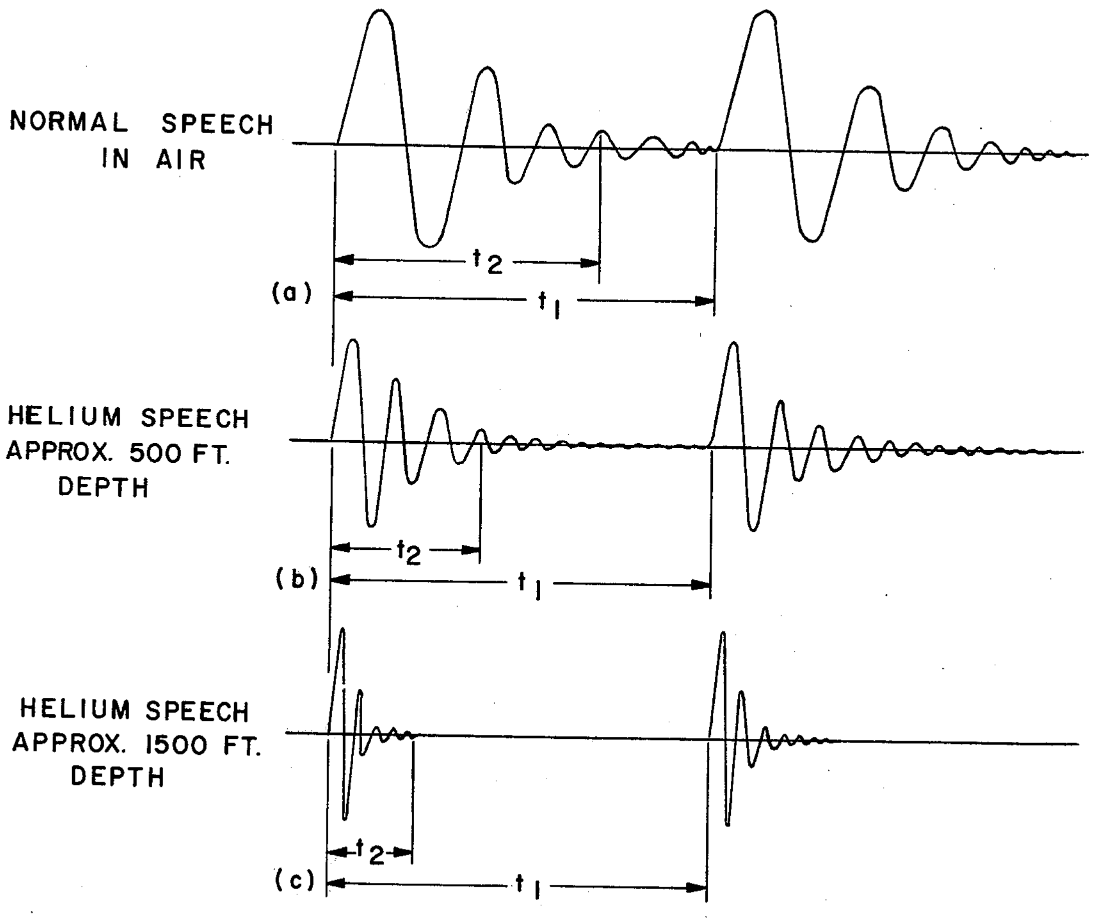
FIG. 2 is a diagram illustrating the increase in resonant frequency of voice communications made in helium-oxygen environments at deep depths.

Referring now to FIG. 2, the basic pitch of a normal voice corresponds to time $T_1$. This period for most persons is in the range of 5 to 7 milliseconds and for the adult voice is normally about 7.5 milliseconds. The spectrum of resonant voice frequencies from the vocal tract $T_2$ is illustrated as that which occurs in normal intelligible speech in FIG. 2(*a*). In air, the bandwidth of frequencies in the spectrum of resonant frequencies corresponding to time $T_2$, is normally about 400 to 4,000 Hz. In a helium-oxygen environment at about 500 feet depth, the band range is about 800 to 8,000 Hz which corresponds with the shorter time $T_2$ in FIG. 2(*b*). In a helium-oxygen environment at a depth of about 1,500 feet, the bandwidth of frequencies is about 1,400 to 14,000 Hz and corresponds to the reduced time period $T_2$ as illustrated in FIG. 2(*c*). It may be understood that the damping of the vocal tract resonance becomes more pronounced with increased pressure and thus with the depth of the dive, and the actual period of vocal tract resonance $T_2$ becomes progressively shorter for increasing pressure in the helium-oxygen environment.

Figure 1:
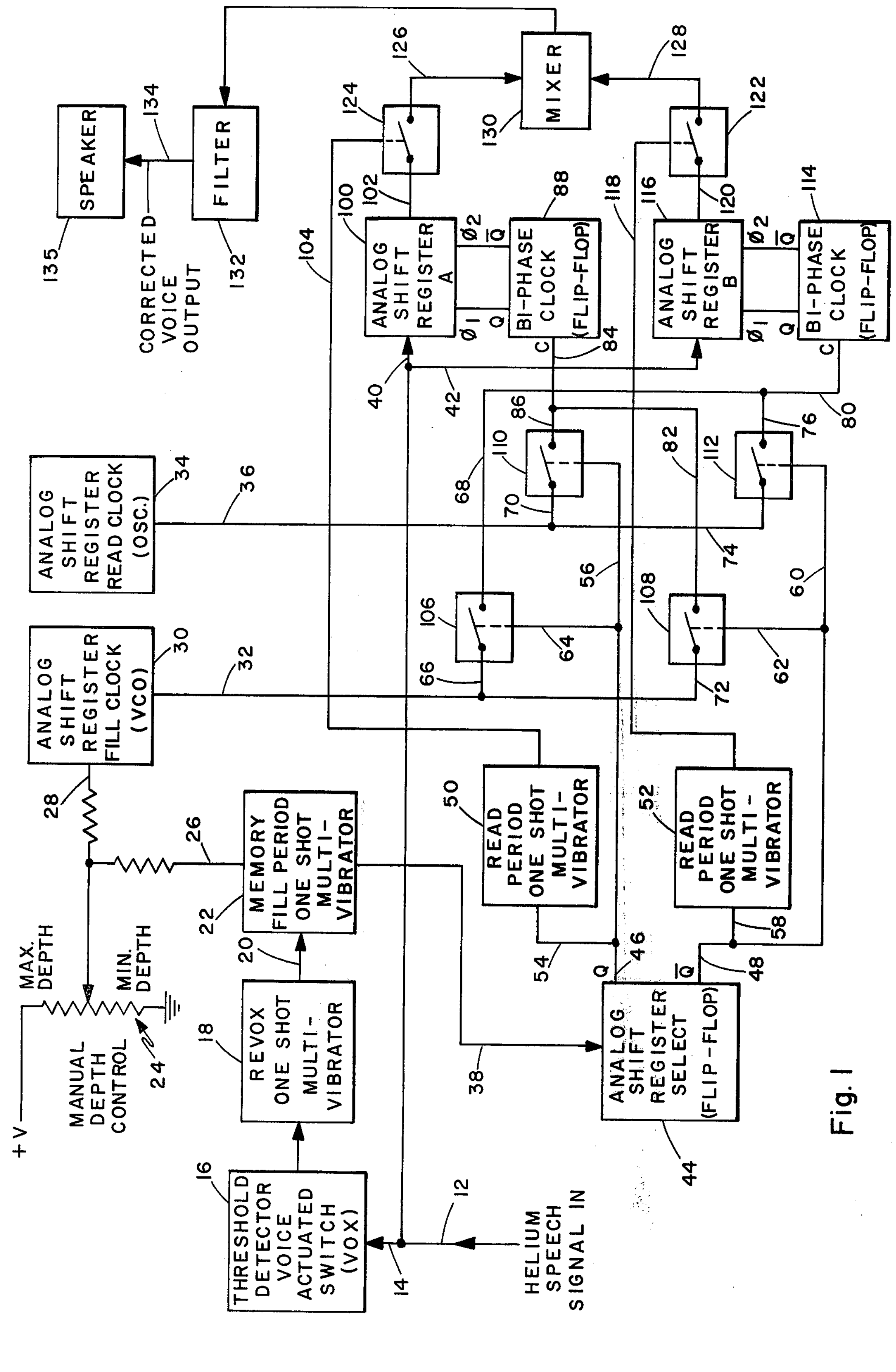
FIG. 1 is a block diagram of an embodiment of the invention.

Referring now to FIG. 1, a diver diving at a given depth and breathing and speaking in a helium-oxygen environment speaks into a transducer that converts the speech into an electrical signal that is eventually fed to line 12. These electrical signals correspond in waveform shape with the waveforms illustrated in FIG. 2 and are fed through lines 12 and 40 to analog shift register 100 and through line 42 to the analog shift register 116.

The helium speech signal in is also fed through line 14 to a threshhold detector voice actuated switch 16. The VOX 16 is a level sensitive detector having a threshold set above the noise level and detects and provides an output signal in response to all absolute signal voltage levels, either positive or negative, that are greater than the set level. The VOX 16 provides an output trigger pulse to the REVOX circuit 18. The REVOX circuit generally comprises, for example, a one-shot multivibrator circuit that provides an output level through line 20 to the memory fill period circuit 22. The REVOX circuit 18 allows only the initial VOX signal from VOX circuit 16 to initiate the memory fill period circuit output and prevents further VOX signals from triggering the memory fill period circuit for, for example, a two to four microsecond period. This time period is normally set at 3.5 microseconds.

Figure 3:
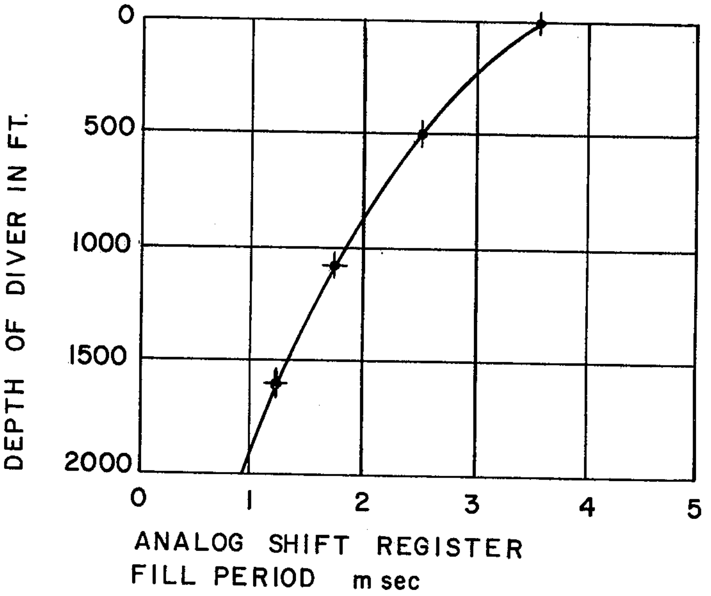
FIG. 3 is a diagram of the increase in required clock signals to store analog input signal in the analog storage device.

The memory fill period or analog shift register fill period circuit 22 comprises, for example, a one-shot multivibrator. While the memory fill period circuit 22 is energized by the signal through line 20, the time duration of the output signal through line 38 to the analog shift register select circuit 44 is dependent upon the voltage input through line 26. The input voltage through line 26 is that voltage set by the manual depth control potentiometer 24. This voltage is set in correspondence with the curve illustrated in FIG. 3, and is also fed through line 28 to the analog shift register fill clock 30. The voltage to these respective circuits thus establish conditions within the circuit that are coordinated with the helium-speech signal N fed to line 12.

The analog shift register fill clock, which may comprise a voltage controlled oscillator, provides output frequency clock pulses through line 32 that have a frequency $f_1$ as set by the voltage of the depth control potentiometer 24. The analog shift register select 44 generally comprises, in this embodiment, a flip-flop circuit having two conditions. In one condition a high or positive level is in the Q output line 46, while a low or negative level is in $\overline{Q}$ output line 48. In the second condition of the flip-flop circuit 44, the outputs are reversed with the high level in line 48 and low level in line 46. The read period circuits 50 and 52 each comprise, for example, one shot multivibrators that are responsive to receiving a high level for feeding a switch closing signal through line 104 to an analog switch 124. This analog switch 124 comprises a switch responsive to an electrical signal for closing a circuit passing analog information. In turn, read period circuit 52 feeds an output signal through line 118 to the analog switch 122.

In one mode of operation, a high output in line 46 feeds a high signal through line 64 to close switch 106 and through line 56 to close switch 110. This in turn feeds the clock frequency $f_1$ signals through lines 32, 66, 68 and 80 to the bi-phase clock flip-flop 114. This in turn in the known manner, drives the analog shift register 116 at the clock frequency $f_1$. So the input helium speech signal in is stored in the analog shift register 116. Simultaneously, switch 110 is closed. This switch 110 connects the output clock frequency signals $f_2$ of the analog shift register read clock 34 through lines 70, 86 and 84 to the bi-phase clock flip-flop 88. This in turn drives the analog shift register 100 at the clock rate $f_2$.

The analog shift register read clock 34 is an oscillator having a preset frequency $f_2$ that provides clock signals at a rate that will clock out the analog stored information in the respective analog registers 100 and 116 to provide normal voice resonant frequency outputs.

Thus it may be understood that when the analog shift register select 44 is in the condition to provide a high signal output in line 46, then the output of the analog shift register fill clock 30 feeds $f_1$ clock signals to the analog shift register 116 that allows the shift register 116 to store the input helium speech signal in at a real time rate corresponding to the resonant frequency of the signal corresponding with the depth of the diver at the time the speech signal is made, as set by the manual depth control 24. Simultaneously, the analog shift register read clock signal frequency $f_2$ is fed to the analog shift register 100 to read out the previously stored information in the register 100 to provide a read out in normal voice resonant frequency. This output analog signal is fed through line 102, closed switch 124, line 126 to the mixer 130, where the signal is then fed through a filter 132 through output line 134 to speaker 135.

In the successive in time operation with the next output signal from the memory fill period multivibrator circuit 22, the analog shift register select 44 provides a high output to line 48 and a low output to line 46. This then energizes switches 108 and 112 to feed the clock frequency signal $f_1$ through lines 72, 82 and 84 to the bi-phase clock 88 and the output frequency $f_2$ through lines 74, 76 and 80 to the bi-phase clock 114. This causes the stored information in analog shift register 116 to be fed through line 120, closed switch 122 and line 128 to the mixer 130. This output signal is then filtered by filter 132 and fed through line 134 to the speaker 135. The mixer 130 functions to combine the audio signals from the shift registers into a common output. Filter 132 removes the superimposed high frequency analog shift register clock signals from the audio signal giving a clean audio signal output to the speaker 135.

Figure 5:
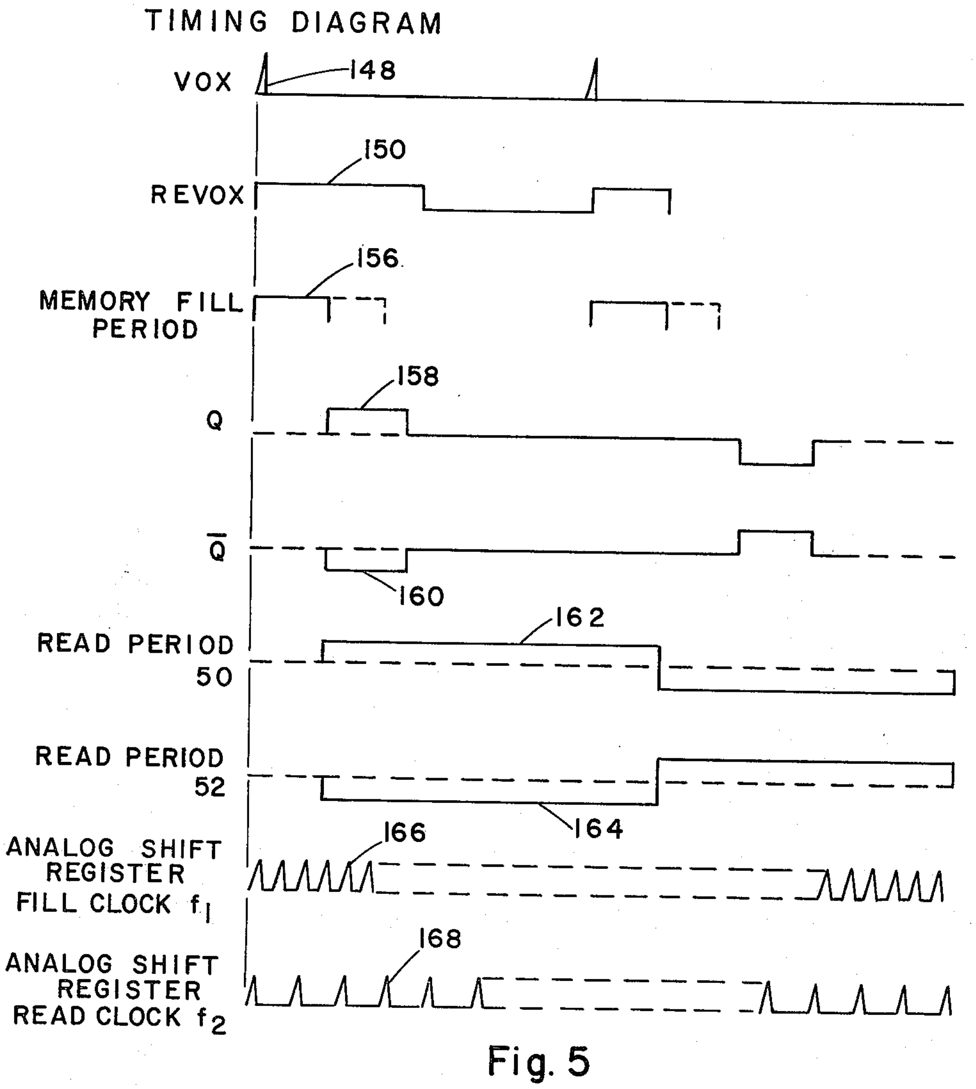
FIG. 5 is a timing diagram of the operation of various components within the system illustrated in the block diagram in FIG. 1.

Referring now to the timing diagram of FIG. 5, the VOX output pulse 148 energizes the REVOX circuit 18. The REVOX circuit thus feeds a level through line 20 to the memory fill period circuit 22 that has a given time period of about 3.5 milliseconds. The energized memory fill circuit 22 then provides an output level through line 38 to the register 44 that has a time period 156 that is set by the voltage output of the potentiometer circuit 24. It may be understood that the deeper the diver is, the shorter time period the memory fill period 156 will be. This memory fill period 156 normally corresponds to the time periods $T_2$ of FIG. 2.

The shift register select 44 then provides a high or low signal in lines 46 and 48 corresponding to the Q and $\overline{Q}$ outputs. These output signals are normally long enough in time to energize the respective read period one-shot multivibrator circuits 50 and 52. These read period outputs have a time length of pulses 162 and 164 that generally are about 7.5 milliseconds, which is the normal voice period for a male voice. During this period of time, the analog shift registers provides a clock $f_1$ output 166 that is varied in time by the manual depth control 24. The analog shift register 34 provides continuous clock outputs 168 corresponding to that of normal voice frequency output.

Figure 4:
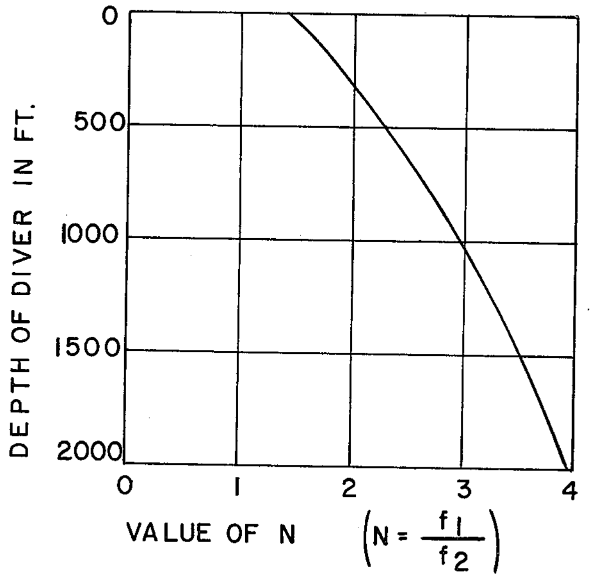
FIG. 4 is a diagram of the relationship of a constant N, that corresponds to the frequency relationship of the clock-in and clock-out signals of the analog storage device relative to the depth of the diver making the speech communication.

It may thus be understood that the circuit is responsive to changes in time $T_2$ while holding a general circuit time of operation corresponding to the normal voice period of time $T_1$. This provides a frequency output relationship corresponding to the depth of the diver in feet, that may have a value N corresponding to the curve illustrated in FIG. 4.

Having described my invention, I now claim:

1. A deep sea diving speech converter for converting a diver's speech made in a gas mixture at depth that has been increased in frequency of resonance from that of a normal frequency of resonance of a diver's voice in air and not at depth including, an analog register, first means for providing first clock signals at a rate proportional to the depth of the diver, second means for providing second clock signals at a rate corresponding to normal voice signals, means for feeding an analog electrical signal proportional to the speech made in the gas to said analog register at said first clock rate, and means for reading out said analog electrical signal to a speaker at said second clock rate.

2. A speech converter as claimed in claim 1 wherein, said first means for providing first clock signals including changing means for changing the rate of said first clock signals corresponding to changes in the depth at which the diver's speech communications are made.

3. A speech converter as claimed in claim 2 including, memory fill period means for providing output signals having time periods corresponding to the period of vocal tract resonance of the diver's speech signal at the depth, and means responsive to said output signals for switching said first and second clock signals to said analog register.

4. A speech converter as claimed in claim 3 including, detector means for detecting the occurence of a diver's speech signal and providing an output signal that energizes said memory fill period means.

5. A speech converter as claimed in claim 4 including, a second analog register, means for feeding said analog electrical signals to said second analog register, and switch means for selectively switching said first clock signals to said second analog register and said second clock signals to said first analog register at successive times.

6. A speech converter as claimed in claim 5 wherein, said switch means including means for providing one of said analog registers with said first clock signals while said second analog register is being provided with said second clock signals, whereby said first analog register is receiving analog electrical signal inputs while said second analog register is simultaneously reading out the previously stored analog electrical signals to a speaker.

7. The method of converting a diver's speech made in a gas mixture at depth that has been increased in frequency of resonance from that of a normal frequency of resonance of a diver's voice in air and not at depth including, providing first clock signals at a rate proportional to the depth of the diver, providing second clock signals at a rate corresponding to normal voice signals, feeding an analog electrical signal proportional to the speech made in the gas to an analog register at the first clock rate, and clocking out the stored analog electrical signal to a speaker at the second clock rate.

8. The method as claimed in claim 7 including the step of, changing the rate of said first clock signals corresponding to changes in the depth at which the diver's speech communications are made.

9. The method as claimed in claim 8 including the steps of, providing output signals having time periods corresponding to the period of vocal tract resonance of the diver's speech signal at the depth, and switching said first and second clock signals to the analog register in response to the timing of the output signals.

* * * * *